US007110376B2

United States Patent
Lindoff et al.

(10) Patent No.: US 7,110,376 B2
(45) Date of Patent: Sep. 19, 2006

(54) METHOD AND APPARATUS FOR IMPROVED CELL DETECTION

(75) Inventors: Bengt Lindoff, Bjärred (SE); Johan Nilsson, Malmö (SE); Bo Bernhardsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1018 days.

(21) Appl. No.: 10/121,108

(22) Filed: Apr. 10, 2002

(65) Prior Publication Data

US 2003/0193926 A1   Oct. 16, 2003

(51) Int. Cl.
    *H04Q 7/00*   (2006.01)
(52) U.S. Cl. ............... 370/331; 370/350; 375/152; 375/354; 455/437
(58) Field of Classification Search ............. 370/331, 370/332; 375/152
    See application file for complete search history.

(56) References Cited

U.S. PATENT DOCUMENTS

| | | | | |
|---|---|---|---|---|
| 5,594,943 | A * | 1/1997 | Balachandran | 455/436 |
| 6,894,996 | B1 * | 5/2005 | Lee | 370/337 |
| 2002/0041580 | A1 * | 4/2002 | Shoji et al. | 370/335 |

FOREIGN PATENT DOCUMENTS

| EP | 1 195 918 A2 | 4/2002 |
|---|---|---|
| EP | 1 211 816 A1 | 6/2002 |
| WO | WO 02/13548 A2 | 2/2002 |

OTHER PUBLICATIONS

Yi-Pin Eric Wang and Tony Ottosson, Cell Search in W-CDMA, IEEE Journal On Selected Areas in Communications, vol. 18, No. 8, Aug. 2000, pp. 1470-1482.
Erik Dahlman, Per Beming, Jens Knutsson, Fredrik Ovesjö, Magnus Persson, and Christiaan Roobol, WCDMA—The Radio Interface for Future Mobile Multimedia Communications, IEEE Transactions On Vehicular Technology, vol. 47, No. 4, Nov. 1998, pp. 1105-1118.
Østergaard Nielsen, A. et al., "WCDMA Initial Cell Search", VTC 2000-Fall, IEEE VTS 52nd Vehicular Technology Conference, Boston, MA, Sep. 24-28, 2000, IEEE Vehicular Technology Conference, New York, NY: IEEE, US, vol. 1 of 6, Conf. 52, Sep. 24, 2000, (pp. 377-383).
Amadei, D., Standard Search Report prepared by the European Patent Office, as completed Dec. 6, 2002, (4 pgs.).

\* cited by examiner

*Primary Examiner*—Hassan Kizou
*Assistant Examiner*—Mohammad S. Adhami (57) ABSTRACT

A method and apparatus for improved cell detection in a cellular communication system correlates a received signal with both a primary synchronization signal and a secondary synchronization signal. The results from the primary and secondary synchronization detection are used to determine if a new cell has been found. By also including the secondary synchronization signal during the cell detection procedure, the rate of false detection can be reduced while still maintaining detection performance. In addition, a longer standby time can be achieved for the user terminal.

29 Claims, 7 Drawing Sheets

METHOD AND APPARATUS FOR IMPROVED CELL DETECTION

BACKGROUND OF THE INVENTION

1. Technical Field of the Invention

The present invention generally relates to cell detection by terminals in mobile radio systems which use at least two synchronization signals for base station synchronization.

2. Description of Related Art

Code division multiple access (CDMA) communication technologies were developed to allow for multiple users to share scarce radio communication resources. In the general CDMA method, each user terminal is assigned a unique code sequence to be used to encode its information signal. A receiver, knowing the code sequences of the user terminal, can decode the received signal to reproduce the original information signal. The use of the unique code sequence during modulation provides for an enlarging of the spectrum of the transmitted signal resulting in a spread spectrum signal. The spectral spreading of the transmitted signal gives rise to the multiple access capability of CDMA.

If multiple users transmit spread spectrum signals at the same time, the receiver will still be able to distinguish a particular user's signal, provided that each user has a unique code and the cross-correlation between codes is sufficiently low. Ideally, the cross-correlation should be zero, i.e., the codes should be orthogonal in the code space. Correlating a received signal with a code signal from a particular user will result in the despreading of the information signal from that particular user, while signals from other users will remain spread out over the channel bandwidth.

An improvement of the CDMA method, known as Wideband CDMA (WCDMA), has been developed by a number of organizations around the world. One of the most popular of these WCDMA efforts is that of the Third Generation Partnership Project (3GPP). Some of the benefits provided by WCDMA include support for increased bandwidth and bitrates, and provisions for packet data communication and other services. In a WCDMA system, a mobile terminal, referred to as user equipment (UE), communicates with one or more base stations each serving a particular cell.

An important consideration for mobile terminals in a communication system, such as a WCDMA system, is that of standby time. To increase standby time the power consumption when the terminal is turned on, but not in use, should be minimized. Power consumption can be reduced by powering off parts of the terminal, such as signal processing circuitry, when it is not in use. However, the primary factor that limits standby time in a terminal is the need for the terminal to monitor for signals, such as paging messages, and perform signal measurements, such as signal strength measurements of nearby cells, during standby. Another important, but power demanding procedure is that of cell search or cell detection. This procedure includes searching for new cells close to the terminal. False cell detection results in the unnecessary powering up of mobile terminal circuitry, which contributes to increased power consumption and reduced standby time. The present invention provides for an improved method for cell detection which reduces the false detection rate and improves detection performance. In addition, a longer standby time for the terminal can be achieved.

SUMMARY OF THE INVENTION

The present invention comprises a method and apparatus for improved cell detection in a cellular communication system. A method in accordance with one embodiment of the invention includes correlating a received signal with both a primary synchronization signal and a secondary synchronization signal. The results from primary and secondary synchronization detection are used to determine if a new cell has been found. By also including the secondary synchronization signal during the cell detection procedure, the rate of false detection can be reduced while still maintaining detection performance. In addition, a longer standby time can be achieved for the user terminal.

In accordance with an alternative embodiment of the invention, a method includes correlating a received signal with both a primary synchronization signal and a secondary synchronization signal. A decision variable is determined from the primary detection signal and compared to a first threshold. If the decision variable is greater than the first threshold, a new cell is determined as having been found. If the decision variable is less than the first threshold, the decision variable is compared to a second threshold. If the decision variable is less than the first threshold and greater than the second threshold, the secondary synchronization signal is used to determine if a new cell has been found.

In another embodiment of the invention, an apparatus includes a front end receiver for receiving a communication signal, a primary synchronization channel correlator for correlating the received signal with a primary synchronization signal to produce a primary detection signal, and a secondary synchronization channel correlator for correlating the received signal with a secondary synchronization signal to produce a secondary detection signal. The apparatus further includes a detector for determining if a new cell has been found using the primary detection signal and the secondary detection signal.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
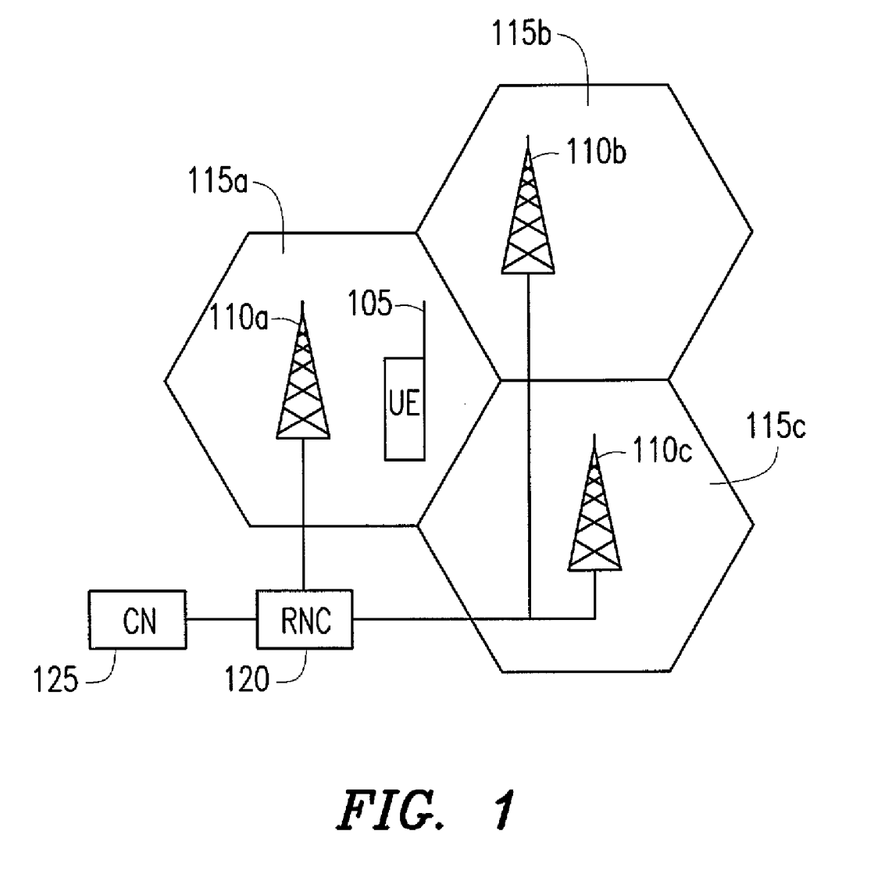
FIG. 1 illustrates a block diagram of a conventional wireless WCDMA communication system.

Reference is now made to the Drawings wherein like reference characters denote like or similar parts throughout the various Figures. Referring now to FIG. 1, a block diagram of a conventional wireless WCDMA communication system 100 is illustrated. User equipment (UE) 105, e.g., a mobile station, communicates with one or more radio base stations 110a, 110b, 110c. Each base station 110a, 110b, 110c serves a respective service area referred to as a cell 115a, 115b, 115c. Each base station 110a, 110b, 110c is connected to a radio network controller (RNC) 120 that is responsible for handover decisions as well as other functions of the radio network. In addition, the RNC 120 can be connected to a core network (CN) 125 that provides a connection from the WCDMA network 100 to other networks, such as a public switched telephone network (PSTN) or base stations of other wireless access technologies, such as CDMA or GSM systems.

User equipment (UE) 105, that is currently associated with a particular base station 110a within a cell 115a, monitors the signal strengths of pilot signals from the associated base station 110a and neighboring base stations 110b,110c. If the user equipment (UE) 105 is currently roaming from the current cell 115a into a neighboring cell 115b, base station 110a will handoff the user equipment (UE) 105 to the neighboring base station 110b based upon the relative strength of the pilot signal from each base station 110a, 110b. The process by which the user equipment (UE) 105 monitors for the presence of signals from neighboring base stations 110a, 110b, 110c is referred to as cell search. Cell search is performed in both the active and idle modes of the user equipment (UE) 105.

Figure 2:
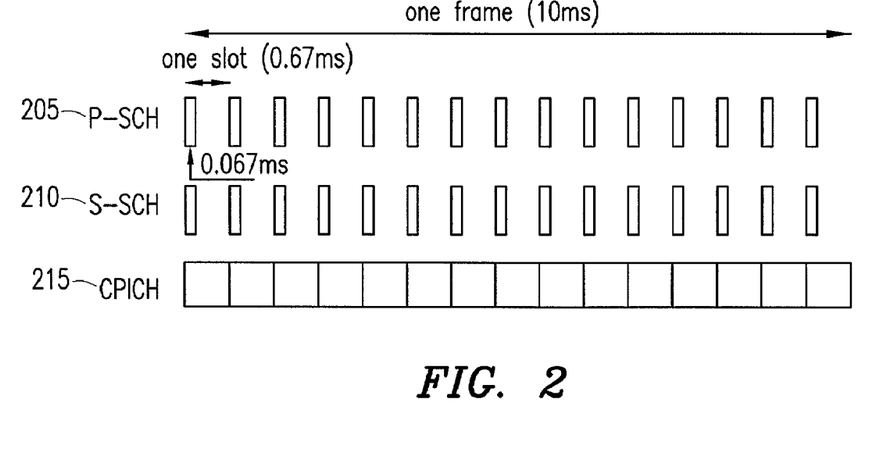
FIG. 2 illustrates conventional frame and slot structures for communication channels used to facilitate cell search in a WCDMA system.

Referring now to FIG. 2, conventional frame and slot structures for communication channels used to facilitate cell search in a WCDMA system are illustrated. To facilitate cell search in a WCDMA system a Primary Synchronization Channel (P-SCH) 205, a Secondary Synchronization Channel (S-SCH) 210, and a Common Pilot Channel (CPICH) 215 are used. Each 10 ms frame is divided into fifteen slots, each of length 2560 chips. The P-SCH 205 consists of an unmodulated orthogonal Gold code with a length of 256 chips that is transmitted once in each slot of the frame. The 256 chips of the P-SCH 205 consists of the Primary Synchronization code, that is the same for every base station within the communication system. The P-SCH 205 is used to provide slot synchronization during the cell search procedure.

The S-SCH 210 consists of a modulated Gold code of length 256 chips transmitted in parallel with the P-SCH 205. The S-SCH 210 is used to identify the frame boundary and scrambling code group identity. In contrast to the P-SCH sequence, the S-SCH sequences vary from slot to slot and between base stations. Each slot of the S-SCH 210 includes an S-SCH sequence chosen from a set of sixteen different available codes of length 256 chips. A frame consisting of fifteen slots of S-SCH codes forms a codeword taken from a codebook of 64 possible codewords. The codeword indicates to which of the 64 different code groups the base station's downlink scrambling code belongs. The same S-SCH codeword is repeated in each frame.

The CPICH 215 is a channel used to carry downlink common pilot symbols and is scrambled by the primary downlink scrambling code. Within each CPICH time slot there are ten pilot symbols, each spread by 256 chips. The CPICH 215 serves as the default phase reference for various downlink channels, such as the P-SCH 205 and S-SCH 210.

Figure 3:
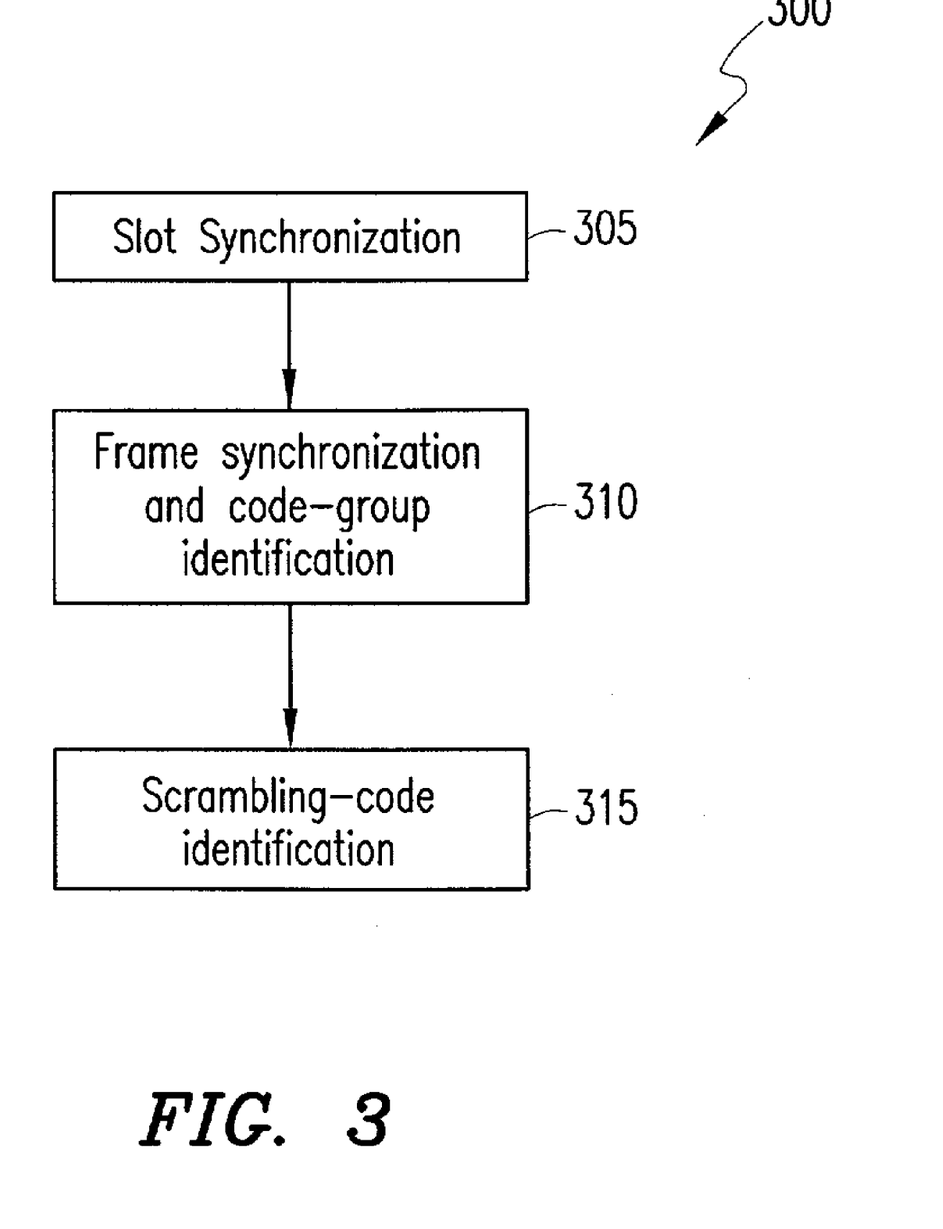
FIG. 3 illustrates a conventional cell search procedure in flowchart form.

Referring now to FIG. 3, a conventional WCDMA cell search procedure 300 is illustrated in flowchart form. During a cell search procedure, the user equipment (UE) searches for the cell 115 associated with the base station 110 that provides the strongest signal and determines the scrambling code and frame synchronization of that cell. In step 305, the UE uses the P-SCH to acquire slot synchronization to the strongest base station. This is typically performed with a matched filter matched to the primary synchronization code that is common to all cells. The output of the matched filter will have peaks corresponding to each ray of each base station within range of the UE. The slot synchronization of the strongest cell is obtained by detecting the largest peak in the matched filter output. In this manner, the P-SCH is used to detect a new cell and its slot boundaries.

In step 310, the UE uses the S-SCH to acquire the frame synchronization and identify the code group of the cell found in step 305. This is performed by correlating the received slot-synchronized signal with all possible secondary synchronization code sequences, and identifying the maximum correlation value. Since the cyclic shifts of the sequences are unique, the S-SCH codeword sequence may be identified. By identifying the S-SCH codeword sequence, the code group as well as the frame synchronization is determined.

In step 315, the UE identifies the exact primary scrambling code used by the found base station cell. The primary scrambling code is typically identified through symbol-by-symbol correlation over the CPICH with all codes within the code group identified in step 310. Because frame synchronization was obtained in step 310, the starting point of the primary scrambling code is known. Once the primary scrambling code has been identified, system-specific and cell-specific information can be obtained by the UE from the Broadcast channel. However, the conventional cell search procedure for WCDMA always presents a risk for false detection, i.e. a new cell is indicated by the P-SCH detector but no new cell is actually present. This causes, particularly in idle mode, unnecessary signal reception and signal processing, which degrades the stand-by performance for the UE.

In accordance with the principles of the present invention, it can be observed that the secondary synchronization signal transmitted on S-SCH intended for frame synchronization and scrambling code group identification, are generated as sixteen concatenated core sequences of length 16 chips multiplied with a value of 1 or −1. As a result, all secondary synchronization signals consist of the same core sequence and can thus be used, along with the primary synchronization signal transmitted on the P-SCH, during the initial synchronization stage. By also including the secondary synchronization signal during initial synchronization, the false detection rate can be reduced while maintaining detection performance and achieving a longer standby time for the user equipment.

Figure 4:
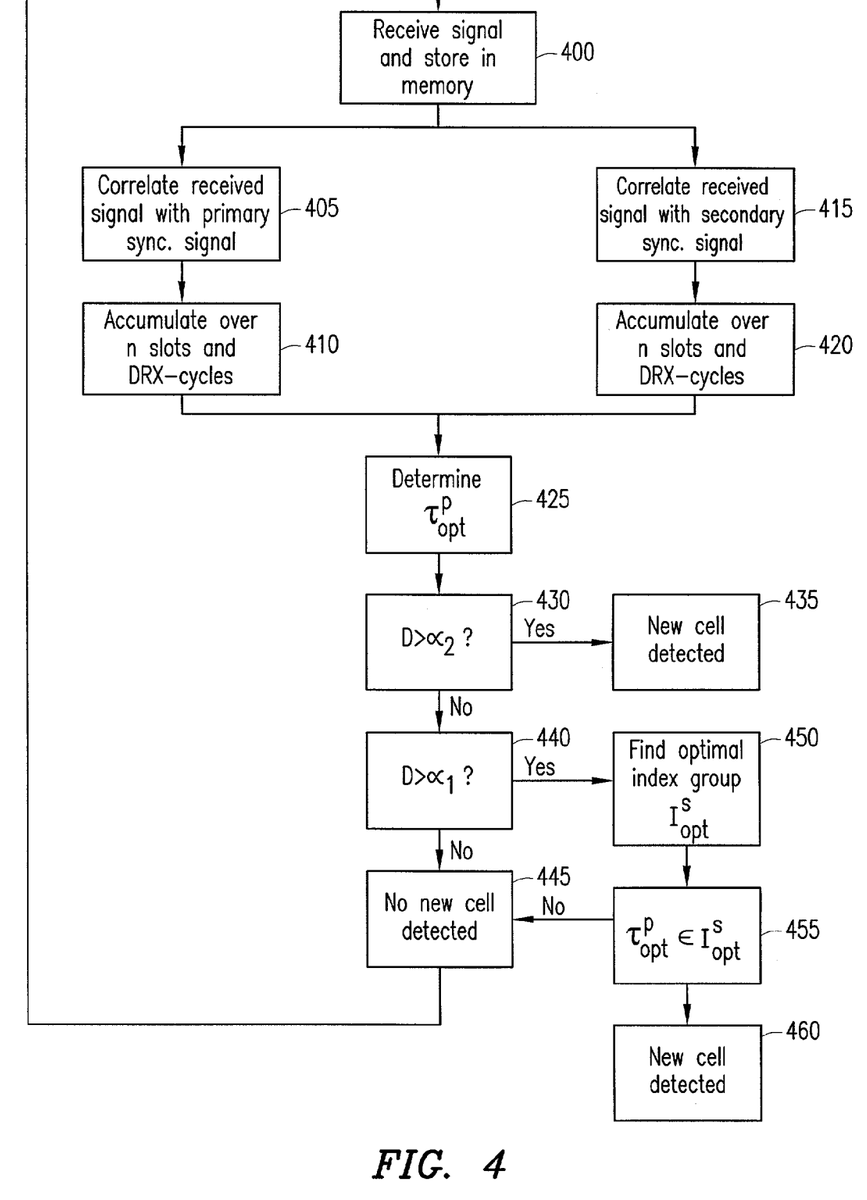
FIG. 4 illustrates a method in flowchart form for cell detection in accordance with the principles of the present invention.

Referring now to FIG. 4, a method for cell detection in accordance with the principles of the present invention is illustrated in flowchart form. Pursuant to a discontinuous reception (DRX) procedure, a receiver within the UE is turned on at a time instant in accordance with an internal clock used as a time reference. In step 400, the signal is received, filtered, and downconverted to a baseband signal $y_t$. The baseband signal $y_t$ is then stored in a memory. In step 405, the baseband signal $y_t$ is correlated with the codeword corresponding to the primary synchronization channel (P-SCH), which may be performed, for example, through the use of a matched filter. In step 410, the correlation result, or a function of the correlation result, is accumulated over a predetermined number of slots and DRX periods.

In step 415, the baseband signal $y_t$ is correlated with the core sequence of the secondary synchronization channel (S-SCH) and non-coherently accumulated over the sixteen core sequences, which may be performed, for example, through the use of a matched filter. In step 420, the non-coherently accumulated output, or a function of the accumulated output is accumulated over a predetermined number of slots and DRX periods.

Mathematically, the operations performed in steps 405 and 410 are described as follows:

$$d_{\tau,l}^P = \sum_{k=0}^{255} c_{255-k}^P y_{\tau-k,l}$$

$$d_\tau^P = \sum_{l=0}^{nslot_p-1} f_P(d_{\tau,l}^P)$$

$$Q_\tau^P = \sum_{n=1}^{nDRX_p} g_P(d_\tau^P), \tau = 0, \ldots, 2559$$

(Equation 1)

where $y_{k,l}$ is the received signal at chip k slot l, $c_k^P$ is the kth chip in the P-SCH code, $d_{\tau,l}^P$ corresponds to the P-SCH matched filter output for delay $\tau$ for slot l, $d_\tau^P$ is the accumulation over $nslot_p$ slots in one DRX cycle, and $Q_\tau^P$ is the accumulation over $nDRX_p$ cycles and defines a decision variable. Further, $f_P(x)$ and $g_P(x)$ represent functions that define how the P-SCH correlations are accumulated over the slots and DRX cycles, respectively. In one embodiment of the present invention, the functions $f_P(x)$ and $g_P(x)$ are defined as the absolute value of x. However, it should be understood that other functions are possible.

Mathematically, the operations performed in steps 415 and 420 are described as follows:

$$d_{\tau,l}^S = \sum_{i=0}^{15} \left| \sum_{k=0}^{15} c_{255-16i-k}^{P} y_{\tau-16i-k,l} \right|$$

$$d_\tau^S = \sum_{l=0}^{nslot_s-1} f_S(d_{\tau,l}^S)$$

$$Q_\tau^S = \sum_{n=1}^{nDRX_s} g_S(d_\tau^S), \tau = 0, \ldots, 2559$$

(Equation 2)

where $c_k^{S,i}$ is the kth chip in the ith S-SCH code, $d_{\tau,l}^S$ corresponds to the S-SCH matched filter output for delay $\tau$ for slot l, $d_\tau^S$ is the accumulation over $nslot_S$ slots in one DRX cycle, and $Q_\tau^S$ is the accumulation over $nDRX_S$ cycles and defines a decision variable. Further, $f_S(x)$ and $g_S(x)$ represent functions that define how the S-SCH correlations are accumulated over the slots and DRX cycles, respectively. In one embodiment of the present invention, the functions $f_S(x)$ and $g_S(x)$ are defined as the absolute value of x. However, it should again be understood that other functions are possible.

In step 425, the time delay $\tau_{opt}^P$ corresponding to the maximum of $Q_\tau^P$ is then found according to:

$$\tau_{opt}^P = \arg\max_\tau Q_\tau^P$$

(Equation 3)

In step 430, a decision variable of $D = Q_{\tau_{opt}}^P$ is then compared to an upper threshold $\alpha_2$ using a threshold detector. In an alternate embodiment of the present invention, the threshold detector may be based on a normalized variable, D, as defined by:

$$D = \frac{Q_{\tau_{opt}}^P - \text{mean}(Q_\tau^P)}{\text{std}(Q_\tau^P)}$$

(Equation 4)

although other threshold detectors may be used.

If $D > \alpha_2$ there is a strong indication, i.e., a very high probability, that there is a new cell detected and the method proceeds to step 435. In step 435, a new cell is indicated as having been detected and the slot boundary $\tau_{opt}^P$, is identified for that cell. If D is not greater than $\alpha_2$, the method proceeds to step 440.

In step 440, the value of D is compared to the value of a threshold $\alpha_1$. If D is not greater than $\alpha_1$, the method continues to step 445 in which no new cell is indicated as having been detected, and the method returns to step 400 to await the next DTX time instant. If D is greater than $\alpha_1$, the method proceeds to step 450. The threshold values of $\alpha_1$ and $\alpha_2$ are chosen to be indicative of different probabilities that a new cell is found. More specifically, the value of $\alpha_1$ is chosen to indicate a threshold level below which there is a low probability that a new cell has been detected. The value of $\alpha_2$ is chosen to indicate a threshold level above which there is a high probability that a new cell has been detected.

When $\alpha_2 > D > \alpha_1$, there exists a possible indication that a new cell is detected. Accordingly, the presence of the new cell is verified using S-SCH detection at step 450. The manner of detection of the S-SCH differs from that of the P-SCH. The decision variable $Q_\tau^S$ for a number of $\tau$-values in a surrounding of $\tau_{opt}^P$ (obtained using Equation 3) are examined and grouped in N bins, each bin including a number of $\tau$-values.

The method used to group the bins is chosen based upon the correlation and autocorrelation structures between the primary and secondary synchronization signals. For example, in a WCDMA system the S-SCH consists of sixteen concatenated core sequences each with a chip length of sixteen. Each core sequence is multiplied by +1 or −1. When correlating a core sequence with an S-SCH sequence, sixteen peaks with sixteen chips distance between the peaks is obtained. If the largest P-SCH correlation peak $\tau_{opt}^P$ is found for a time index of, for example, 1055, S-SCH peaks can be found at time indices $1055 \pm 16*n$, for n=0, 1, 2, . . . , 16. Therefore, for the WCDMA example, sixteen bins are used with every sixteenth sample being contained in a particular S-SCH bin, such that $Q_{\tau_{opt}^P + j + n*16}^S$, for n= . . . , −2, −1, 0, 1, 2, . . . are grouped into a bin j. Further, the surrounding of $\tau_{opt}^P$ can be chosen up to ±256 chips, although in practice only about ±64 chips may be necessary. The components in each bin are summed up and the maximum over a number of the bins is determined. In WCDMA typically only the even bins (j=0, 2, 4, 6, 8, 10, 12, 14) are used due to the autocorrelation properties of the S-SCH core sequence, as the autocorrelation of some of the odd numbered bins is often quite large. Assuming a particular bin i is identified as having the maximum, the optimal bin is designated as $I_{opt}^S$.

Next, in step 455, a determination is made about whether $\tau_{opt}^P$ is included in the $I_{opt}^S$ bin. If $\tau_{opt}^P$ is included in the $I_{opt}^S$ bin, it is determined at step 460 that a new cell has been detected. However, if $\tau_{opt}^P$ does not belong to the $I_{opt}^S$ bin, it is determined at step 445 that no new cell has been detected and the method returns to step 400.

Figure 5:
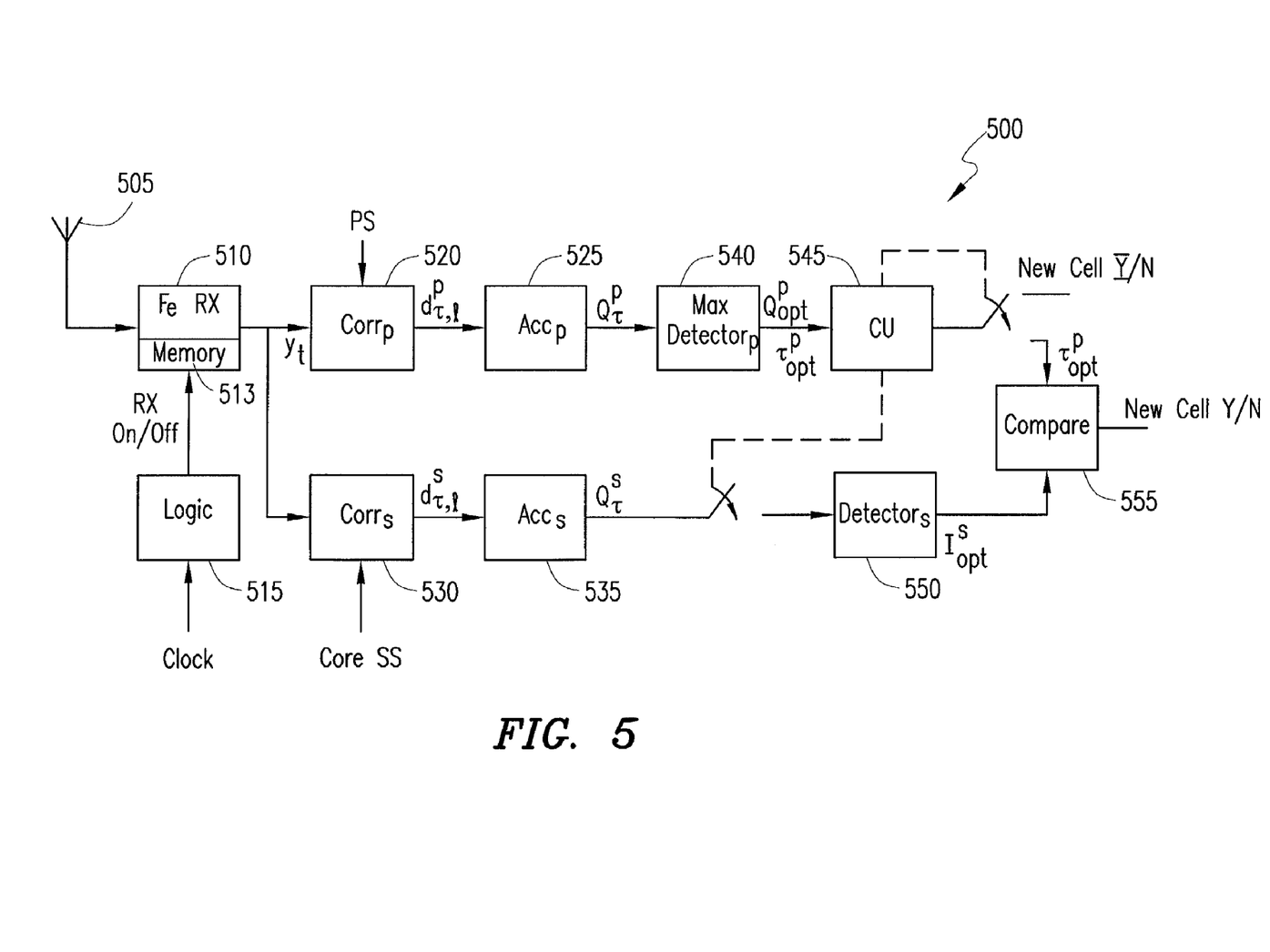
FIG. 5 illustrates an apparatus for cell detection in accordance with the principles of the present invention.

Referring now to FIG. 5, an apparatus for cell detection in accordance with an embodiment of the present invention is illustrated. A receiver 500 is turned on at a time instant controlled by a signal from a logic unit 515 in accordance with a clock signal 517 internal to the receiver. A signal acquired by an antenna 505 is received, filtered, and downconverted to a baseband signal, $y_t$, in a front end receiver 510 and stored in a memory 513. The signal $y_t$ is then provided to a primary synchronization channel correlator 520. The primary synchronization correlator 520 correlates $y_t$ with the P-SCH codeword and outputs a result $d_{\tau,l}^P$. The primary synchronization correlator 520 can consist of a matched filter or any other suitable correlator.

The correlation result $d_{\tau,l}^P$, or a function of the correlation result, is then provided to a primary synchronization accumulator 525. The primary synchronization accumulator 525 accumulates the correlation result over a predetermined number of slots and DRX periods to produce a decision variable $Q_\tau^P$ relating to the primary synchronization channel.

The signal $y_t$ is also provided to a secondary synchronization channel correlator 530. The secondary synchronization correlator 530 correlates $y_t$ with the S-SCH core sequence, and the correlation result is non-coherently accumulated over the sixteen core sequences to produce a correlation result $d_{\tau,l}^S$. The secondary synchronization correlator 530 can consist of a matched filter or any other suitable correlator.

The correlation result $d_{\tau,l}^S$, or a function of the correlation result, is then provided to a secondary synchronization accumulator 535, which accumulates the correlation result over a predetermined number of slots and DRX periods to a produce decision variable $Q_\tau^S$ relating to the secondary synchronization channel.

The decision variable $Q_\tau^P$ for the primary synchronization channel is provided to a maximum detector 540 to produce the values of $Q_{opt}^P$ and $\tau_{opt}^P$ as described in connection with FIG. 4. These values are provide to a control unit (CU) 545 that includes a threshold detector to compare $Q_{\tau_{opt}}^P$, such as through the use of a normalized variable D, with the two thresholds $\alpha_1 < \alpha_2$.

If $D > \alpha_2$, then a new cell is detected, and the slot boundary $\tau_{opt}^P$ is found for that cell. If $Q_{\tau_{opt}}^P$ is below $\alpha_1$, no new cell is detected. If $\alpha_2 > D > \alpha_1$ there is a vague indication that a new cell is detected, and verification using secondary synchronization detection is performed.

During the secondary frequency detection, $Q_\tau^S$ is provided to a secondary synchronization detector 550. The secondary synchronization detector 550 outputs the aforedescribed value $I_{opt}^S$. A comparator 555 receives $\tau_{opt}^P$ from CU 545 and $I_{opt}^S$ from secondary synchronization detector 550 and determines whether $\tau_{opt}^P$ belongs to the $I_{opt}^S$ bin. If $\tau_{opt}^P$ is included in the $I_{opt}^S$ bin, then a new cell is detected, and the slot boundary $\tau_{opt}^P$ for that cell is found. If $\tau_{opt}^P$ does not belong to the $I_{opt}^S$ bin, no new cell is detected.

Figure 6:
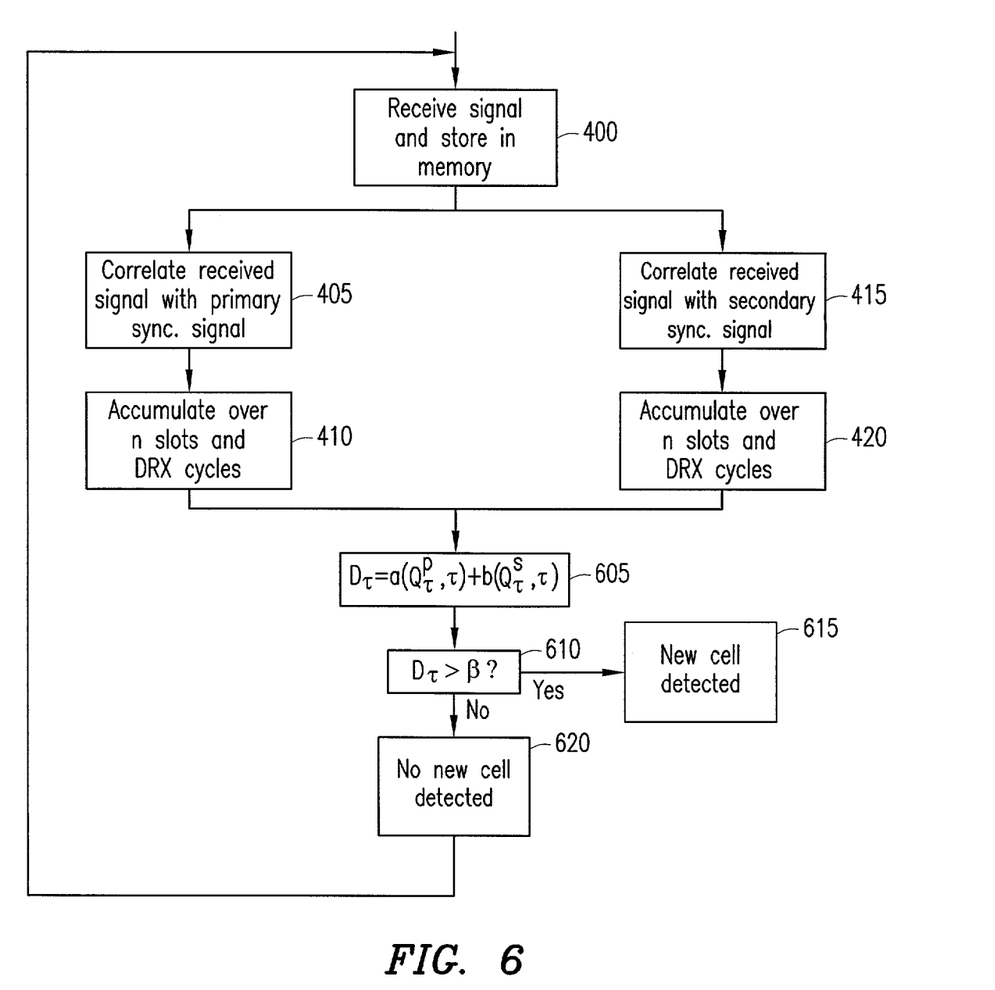
FIG. 6 illustrates another method in flowchart form for cell detection in accordance with the principles of the present invention.

Referring now to FIG. 6, another method for cell detection in accordance with the principles of the present invention is illustrated in flowchart form. In this embodiment, instead of performing detection on the primary synchronization channel and then, if the primary detection signal gives a vague new cell indication, verifying the result using the secondary synchronization channel, the two signals are combined into a single decision variable. This decision variable can then be compared with a threshold value to determine whether a new cell is detected. In this embodiment, steps 400, 405, 410, 415, and 420 are performed as discussed in regards to FIG. 4.

In step 605, the $Q_\tau^P$ value from step 410, and the $Q_\tau^S$ value from step 420 are used to determine a decision variable:

$$D_\tau = a(Q_\tau^P, \tau) + b(Q_\tau^S, \tau) \quad \text{(Equation 5)}$$

where $a(x)$ and $b(x)$ represent predefined functions. The functions $a(x)$ and $b(x)$ are chosen dependent upon the structure of the primary and secondary synchronization signal.

In step 610, the decision variable $D_\tau$ is compared to a threshold value $\beta$. If $D_\tau > \beta$, the method continues to step 615, in which a new cell is determined to have been detected. If $D_\tau$ is not greater than $\beta$, it is determined at step 620 that no new cell has been detected, and the method continues back to step 400.

Figure 7:
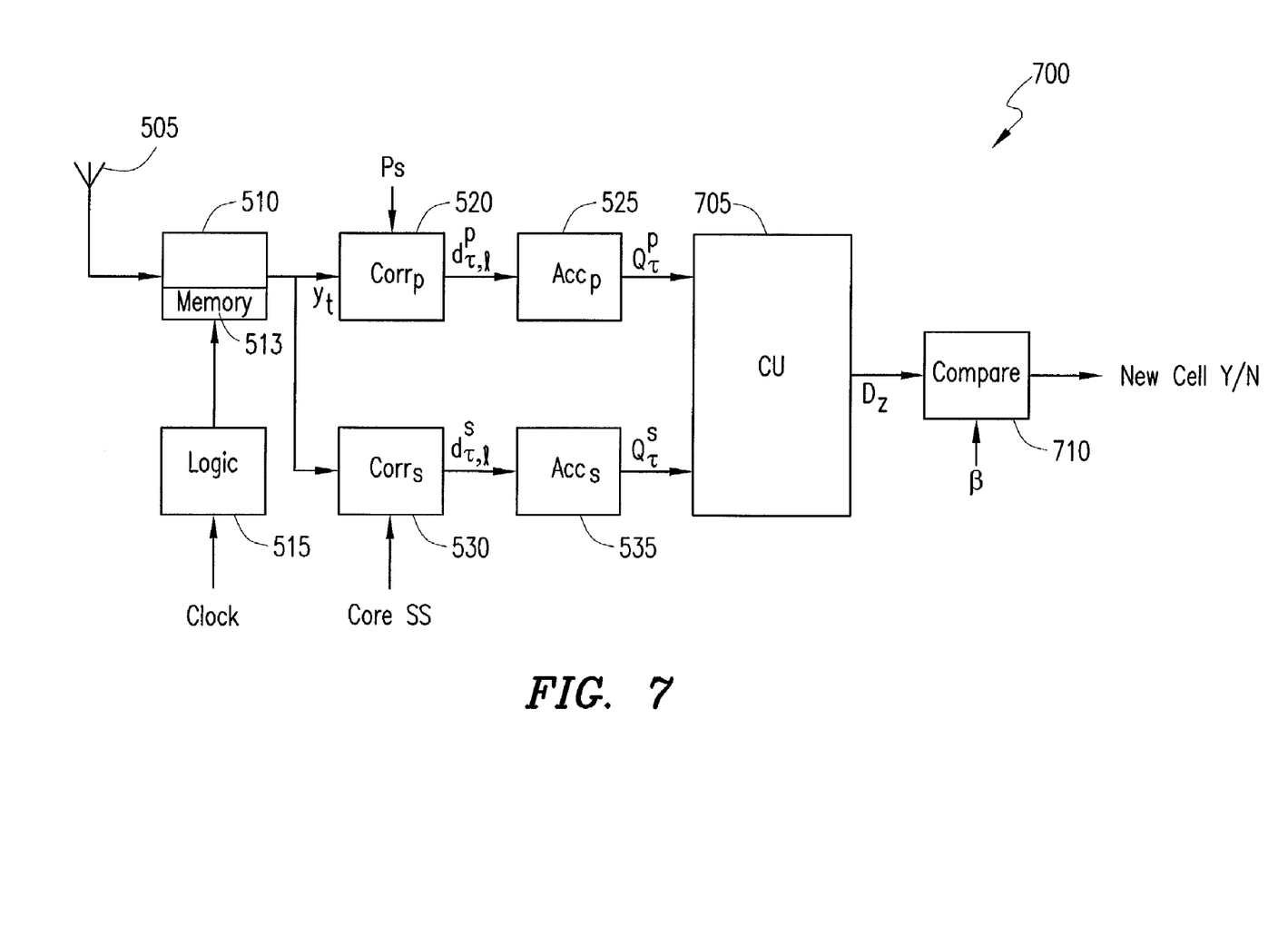
FIG. 7 illustrates another apparatus for cell detection in accordance with an embodiment of the present invention.

Referring now to FIG. 7, another apparatus for cell detection in accordance with an alternative embodiment of the present invention is illustrated. A receiver 700 includes an antenna 505, a front end receiver 510 with a memory 513, a logic unit 515, a clock signal 517, a primary synchronization channel correlator 520, a primary synchronization accumulator 525, a secondary synchronization channel correlator 530, and an secondary synchronization accumulator 535 as discussed in regard to FIG. 5. Decision variable $Q_\tau^P$ from primary synchronization accumulator 525 and decision variable $Q_\tau^S$ from secondary synchronization accumulator 535 are provided to a control unit 705. The control unit 705 determines the value of decision variable $D_\tau$ as described by Equation 5. Decision variable $D_\tau$ is provided to a comparator 710, which compares $D_\tau$ to a threshold value $\beta$. If $D_\tau > \beta$, then a new cell is determined to have been detected. If $D_\tau$ is not greater than $\beta$, it is determined that no new cell has been detected.

Although the present invention has been described using a WCDMA system as an example, the method and apparatus of the present invention may also be used in any communication system in which at least two synchronization signals are used.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for cell detection in a communication system comprising:

receiving a communication signal;

correlating the received signal with a primary synchronization signal to produce a primary detection signal;

correlating the received signal with a secondary synchronization signal to produce a secondary detection signal;

detecting a new cell based on the primary detection signal and the secondary detection signal determining a decision variable from the primary detection signal;

comparing the decision variable to a first threshold;

comparing the decision variable to a second threshold; and using the secondary detection signal to determine if a new cell has been found if the decision variable is less than the first threshold and the decision variable is greater than the second threshold.

2. The method of claim 1, further comprising using the secondary detection signal to determine if a new cell has been found if the decision variable is greater than the first threshold.

3. The method of claim 1, further comprising: determining that no new cell has been found if the decision variable is less than the second threshold.

4. The method of claim 1, further comprising: determining an optimal time delay corresponding to the decision variable.

5. The method of claim 4, wherein the decision variable is determined from a maximum value of the primary detection signal over a plurality of selected time delays.

6. The method of claim 4, wherein the step of using the secondary detection signal to determine if a new cell has been found further comprises: grouping values of the secondary detection signal into a plurality of sets, wherein each set has at least one associated time delay; determining that a new cell has been found if the optimal time delay is associated with a particular set of the plurality of sets.

7. The method of claim 6, further comprising determining for each set a sum of said values in the set, wherein the particular set comprises a set of the plurality of sets having a maximum of said sums.

8. The method of claim 1, further comprising: accumulating the correlated received signal and primary synchronization signal over a number of transmission periods to produce the primary detection signal.

9. The method of claim 1, further comprising: accumulating the correlated received signal and secondary synchronization signal over a predetermined number of transmission periods to produce the secondary detection signal.

10. The method of claim 1, further comprising: determining a decision variable using the primary detection signal and the secondary detection signal; comparing the decision variable to a first threshold; and indicating that a new cell has been found if the decision variable is greater than the first threshold.

11. The method of claim 1, wherein the communication system is a WCDMA system.

12. A method for cell detection in a communication system comprising: receiving a communication signal; correlating the received signal with a primary synchronization signal to produce a primary detection signal; correlating the received signal with a secondary synchronization signal to produce a secondary detection signal; determining a decision variable from the primary detection signal; comparing the decision variable to a first threshold; determining that a new cell has been found if the decision variable is greater than the first threshold; comparing the decision variable to a second threshold if the decision variable is less than the first threshold; and using the secondary detection signal to determine if a new cell has been found if the decision variable is less than the first threshold and the decision variable is greater than the second threshold.

13. The method of claim 12, further comprising: indicating that no new cell has been found if the decision variable is less than the second threshold.

14. The method of claim 12, further comprising: determining an optimal time delay corresponding to the decision variable.

15. The method of claim 14, wherein the decision variable is determined from a maximum value of the primary detection signal over a plurality of selected time delays.

16. The method of claim 14, wherein the step of using the secondary detection signal to determine if a new cell has been found further comprises: grouping values of the secondary detection signal into a plurality of sets, wherein each set has at least one associated time delay; determining that a new cell has been found if the optimal time delay is associated with a particular set of the plurality of sets.

17. The method of claim 12, further comprising: accumulating the correlated received signal and primary synchronization signal over a number of transmission periods to produce the primary detection signal.

18. The method of claim 12, further comprising: accumulating the correlated received signal and secondary synchronization signal over a predetermined number of transmission periods to produce the secondary detection signal.

19. An apparatus for cell detection in a communication system comprising:
  a front end receiver for receiving a communication signal;
  a primary synchronization channel correlator for correlating the received signal with a primary synchronization signal to produce a primary detection signal;
  a secondary synchronization channel correlator for correlating the received signal with a secondary synchronization signal to produce a secondary detection signal;
  a detector for determining if a new cell has been found using the primary detection signal and the secondary detection signal;
  a primary synchronization accumulator for determining a decision variable from the primary detection signal,
  said detector including a control unit for comparing the decision variable to a first threshold and a second threshold, wherein the detector uses the secondary detection signal to determine if a new cell has been found if the decision variable is less than the first threshold and the decision variable is greater than the second threshold.

20. The apparatus of claim 19, wherein the detector uses the secondary detection signal to determine if a new cell has been found if the decision variable is greater than the first threshold.

21. The apparatus of claim 19, further comprising: a maximum detector for determining an optimal time delay corresponding to the decision variable.

22. The apparatus of claim 21, wherein the decision variable is determined from a maximum value of the primary detection signal over a plurality of selected time delays.

23. The apparatus of claim 21, wherein the detector further includes: a secondary synchronization detector for grouping values of the secondary detection signal into a plurality of sets, wherein each set has at least one associated time delay; and a comparator for determining that a new cell has been found if the optimal time delay is associated with a particular set of the plurality of sets.

24. The apparatus of claim 19, wherein the primary synchronization channel correlator comprises a matched filter.

25. The apparatus of claim 19, wherein the secondary synchronization channel correlator comprises a matched filter.

26. The apparatus of claim 19, further comprising: a primary synchronization accumulator for accumulating the correlated received signal and primary synchronization signal over a number of transmission periods to produce the primary detection signal.

27. The apparatus of claim 19, further comprising: a secondary synchronization accumulator for accumulating the correlated received signal and secondary synchroniza tion signal over a number of transmission periods to produce the secondary detection signal.

28. The apparatus of claim 19, wherein the detector further includes: a control unit for determining a decision variable using the primary detection signal and the secondary detection signal; and a comparator for comparing the decision variable to a first threshold and indicating that a new cell has been found if the decision variable is greater than the first threshold.

29. The apparatus of claim 19, wherein the communication system is a WCDMA system.

* * * * *

UNITED STATES PATENT AND TRADEMARK OFFICE
CERTIFICATE OF CORRECTION

PATENT NO. : 7,110,376 B2  
APPLICATION NO. : 10/121108  
DATED : September 19, 2006  
INVENTOR(S) : Lindoff et al.

Page 1 of 1

It is certified that error appears in the above-identified patent and that said Letters Patent is hereby corrected as shown below:

In Column 5, line 37, in Equation 2, delete "
$$d_\tau^S = \sum_{i=0}^{15}\left|\sum_{k=0}^{15}c^P 255-16i-k^{Y\tau-16i-k,l}\right|$$
"

and insert --
$$d_\tau^S = \sum_{i=0}^{15}\left|\sum_{k=0}^{15}c^s 255-16i-k^{Y\tau-16i-k,l}\right|$$
--, therefor.

In Column 5, line 63, Equation 3, delete " $\tau_{opt}^P = \underset{\tau}{\arg\max}\, Q_\tau^P$ " and insert -- $\tau_{opt}^P = \underset{\tau}{\arg\max}\, Q_\tau^P$ --, therefore.

Signed and Sealed this

First Day of April, 2008

JON W. DUDAS  
*Director of the United States Patent and Trademark Office*